United States Patent [19]
Tajima

[11] Patent Number: 5,850,915
[45] Date of Patent: *Dec. 22, 1998

[54] WATER-RESISTANT PORTABLE RECEIVER CASE

[75] Inventor: Kazuaki Tajima, Yokohama, Japan

[73] Assignee: Oi Electric Co., Ltd., Yokohama, Japan

[ * ] Notice: The term of this patent shall not extend beyond the expiration date of Pat. No. 5,713,466.

[21] Appl. No.: 961,460

[22] Filed: Oct. 30, 1997

Related U.S. Application Data

[63] Continuation of Ser. No. 788,824, Jan. 23, 1997, Pat. No. 5,713,466, which is a continuation of Ser. No. 316,129, Sep. 30, 1994.

[51] Int. Cl.$^6$ .............................. B65D 85/38; B65D 65/02
[52] U.S. Cl. ............................ 206/320; 206/305; 224/253
[58] Field of Search ..................................... 206/305, 320, 206/579; 224/252, 253

[56] References Cited

U.S. PATENT DOCUMENTS

| | | |
|---|---|---|
| 4,006,764 | 2/1977 | Yamamoto et al. . |
| 4,259,568 | 3/1981 | Dynesen . |
| 4,584,718 | 4/1986 | Fuller . |
| 4,778,027 | 10/1988 | Taylor . |
| 4,901,852 | 2/1990 | King . |
| 5,025,921 | 6/1991 | Gasparaitis et al. . |
| 5,092,459 | 3/1992 | Uljanic et al. . |
| 5,261,583 | 11/1993 | Long et al. . |
| 5,383,091 | 1/1995 | Snell . |

FOREIGN PATENT DOCUMENTS 0545867  6/1993  European Pat. Off. .

*Primary Examiner*—M. D. Patterson
*Attorney, Agent, or Firm*—Loeb & Loeb LLP

[57] ABSTRACT

Although this water-resistant case covers the entire body of a portable receiver, it does not decrease the sound effect of a buzzer from the receiver. The case also offers the same water-proof effect as the prior product. It is a water-resistant portable receiver case that prevents any water from getting into the portable receiver. The characteristics of the subject case is that, it has a display window positioned to match that of the display light on the aforementioned portable receiver, a hole tightly closed with a seal capable of letting the air to get through but not a drop of water positioned to match the buzzer of the aforementioned receiver, and a button to push the switch on the aforementioned receiver from the outside.

9 Claims, 3 Drawing Sheets

WATER-RESISTANT PORTABLE RECEIVER CASE

This is a continuation of application Ser. No. 08/788,824 filed on Jan. 23, 1997, U.S. Pat. No. 5,713,466 which is a continuation of application Ser. No. 08/316,129 filed Sep. 30, 1994, now allowed.

FIELD OF THE INVENTION

This device relates to a portable receiver such that does not hinder functions of the aforementioned portable receiver to be covered by this case. Portable receivers to be covered by the subject case include pagers, radios, transceivers, and cellular telephones.

DESCRIPTION OF THE ART

Portable receivers such as pagers let users know that he or she has incoming calls or messages are widely in use. A portable pager, for instance, may come with a clip-on holder and may be attached to the user's belt. Consequently, a pager often malfunctions or breaks if worn on a rainy day or if dropped and liquid gets into the pager.

One way to solve the problem is to provide a water-resistant case that completely covers the subject receiver completely and prevents any water from getting into the pager.

However, such a case that completely covers the pager also prevents a user from being able to hear the buzzer which tells him/her that there is an incoming call.

SUMMARY OF THE INVENTION

This device is intended to solve the aforementioned problems. The purpose of this device is to offer water-resistant portable receiver cases that can maintain the same volume of the buzzer as do conventional receivers without changing any of the water-proof effect offered by the prior water-resistant cases.

To meet this goal, the subject case comes with the following special features: a display window positioned to match that of the display area on the aforementioned portable receiver so that the user may recognize incoming calls, a hole tightly closed by a seal capable of letting the air get through but not a drop of water positioned to match the buzzer of the aforementioned receiver, and a button to push the switch on the aforementioned receiver from the outside.

The hole in the subject case positioned to match that of the buzzer on the portable receiver is tightly closed with a seal that allows the air to get through but not a drop of water. As a result, the volume of buzzer that tells the user that he/she has an incoming call and the water-proof benefit offered by the prior water-resistant case remain unchanged.

The subject water-resistant portable receiver case also offers a button that allows the switch on the portable receiver to control operations of the said receiver to be pushed from the outside. Consequently, the user does not have to take out the receiver from the case to operate the switch.

DETAILED DESCRIPTION OF THE EMBODIMENTS

Figure 1A:
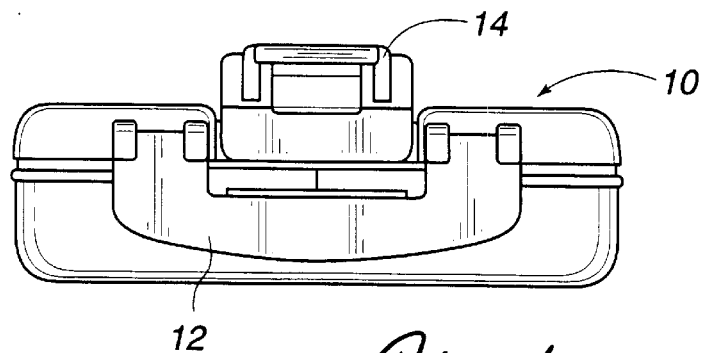
FIGS. 1(*a*), 1(*b*), and 1(*c*) show the front, back, and top views of the water-resistant portable receiver case relating to this invention.
Figure 1B:
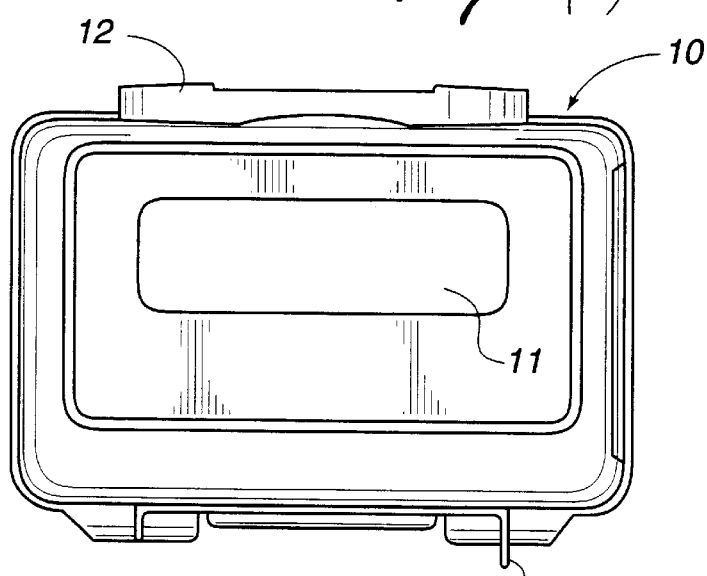
Figure 1C:
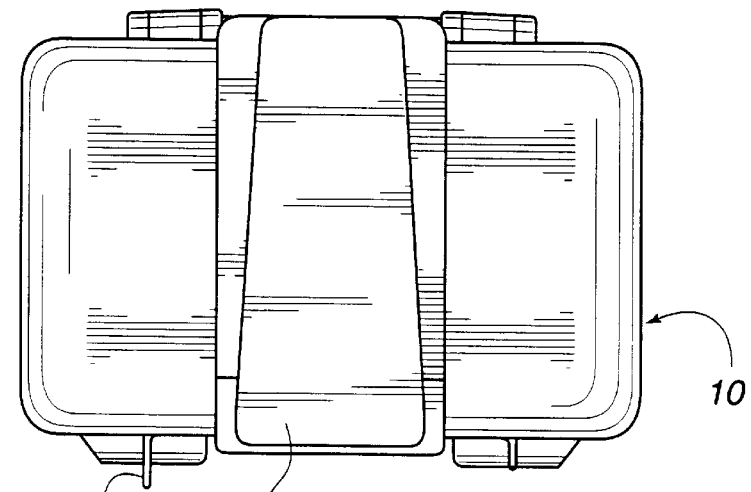
Figure 2:
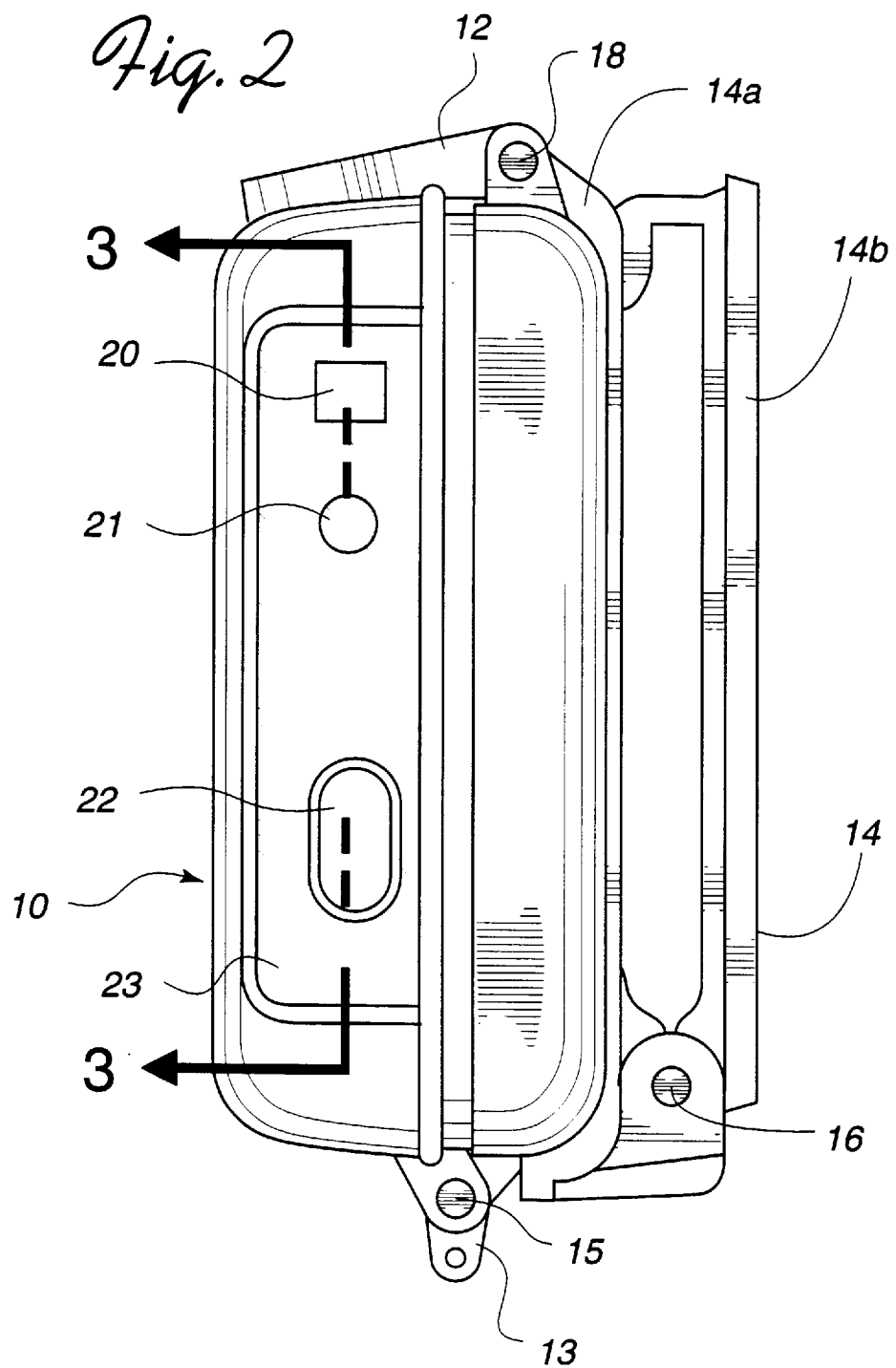
FIG. 2 shows the side view of the case.

FIGS. 1 and 2 show the exterior case 10 for an embodiment of the invention suitable for a conventional pager/receiver. As indicated in FIG. 1(*b*), a display window 11 made of clear plastic such as a clear acrylic plate is provided. The window 11 enables an LCD display section of the portable receiver (not shown) when inserted in the water-resistant portable receiver case 10 to remain visible. Although shown in the center front part of water-resistant case 10, the display window may be positioned to conform to the position of the display in the receiver.

Water-resistant case 10 is formed by a plastic mold and comprises two case portions. A hook 13 is provided in the bottom of the water-resistant case 10 to which a user can attach a chain with a clip (not shown). The clip can then be attached to the user's clothing to prevent the portable receiver from falling or dropping.

As shown in FIG. 1, a snap-on lock 12 is manipulated for opening and closing water-resistant case 10 and ensures that the case is tightly sealed and "O" rings mounted in grooves about the periphery of the case portions may be used for providing improved sealing.

As shown in FIG. 1 (*c*), a clip holder 14 is also provided in the back of water-resistant case 10 for the user to attach water-resistant case 10 to his/her belt.

As shown in FIG. 2, the following features are provided in the indented section on the right side of water-resistant case 10: light display window 20 in the same location as that of a display section of the portable receiver to let the user know when there is an incoming call, a hole 21 tightly sealed by a material that allows the air to get through but not a drop of water in the same location as that of the buzzer on the portable receiver, and a rubber button 22 that allows the user to push the switch on the aforementioned receiver which controls operations of the receiver from the outside.

The snap-on lock 12 and the back upper section of water-resistant case 10 are coupled together by a first axle 18 provided in the back upper section of the case 10.

Figure 4:
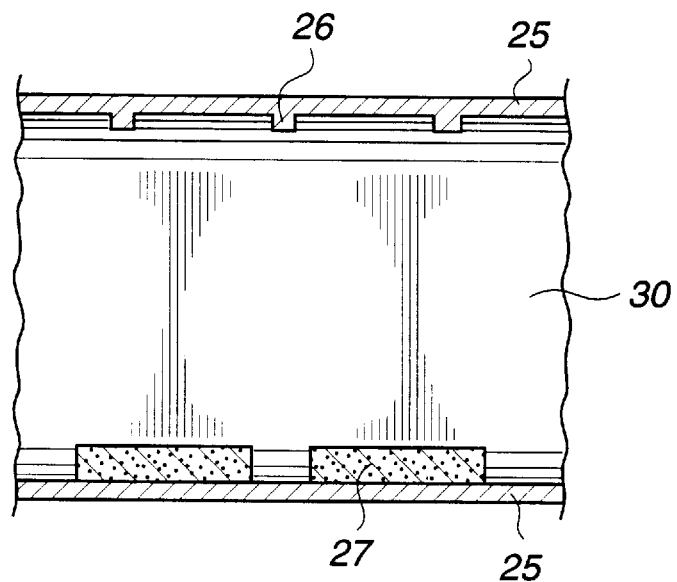
FIG. 4 shows a sectional view of the case with a receiver mounted within the cavity of the case.

The front and the back case portions of the water-resistant case 10 are coupled together by the second axle 15 provided at the bottom of the respective sides. When the case portions are in the closed position as shown in FIGS. 1 and 2, the case portions define a cavity as shown in FIG. 4 to hold a radio receiver 30. Further, by releasing the snap-on lock 12, the two portions may be pivoted with respect to each other about the second axle 15 to an open position so that a receiver 30 may be inserted into the case in the proper orientation.

The aforementioned hook 13 is provided on one of the second axle 15. A holder plate 14*a* and belt sustaining plate 14*b* to which a user can insert his/her belt are also provided as part of a clip holder 14 on the back of water-resistant case 10. The holder plate 14*a* and belt sustaining plate 14*b* are fitted together by the third axle 16.

In general, portable receiver 30 has a vibrating transducer to let a user know that there is an incoming call by the vibration. As a result, the water-resistant case 10 must also be capable of transmitting the respective vibrations from portable receiver 30. Accordingly, this working example is structured as follows:

As shown in FIG. 4, the interior space or cavity of the water-resistant case 10 is in very close proximity (slightly larger) to the exact size of the portable receiver 30 inserted into the case. A pair of cushions 27 made of a urethane sponge or similar materials are placed on the inside face of at least one of the outside case portions 25 of the water-resistant case 10 to ensure that receiver 30 is securely placed in the water-resistant case 10. These cushions 27 are not attached to the entire length of outside case portion 25. At least some part of the inside surface of the case portion 25 will directly touch the receiver 30. Consequently, vibrations of receiver 30 are felt directly by the user.

Since the manner of vibrations from receiver 30 is generally predetermined, alternatively several ribs 26 rather than cushions 27 can be defined in areas along the inside face on the case portion 25 and can touch parts of the receiver 30 in accordance to improve vibrations felt by users.

Figure 3:
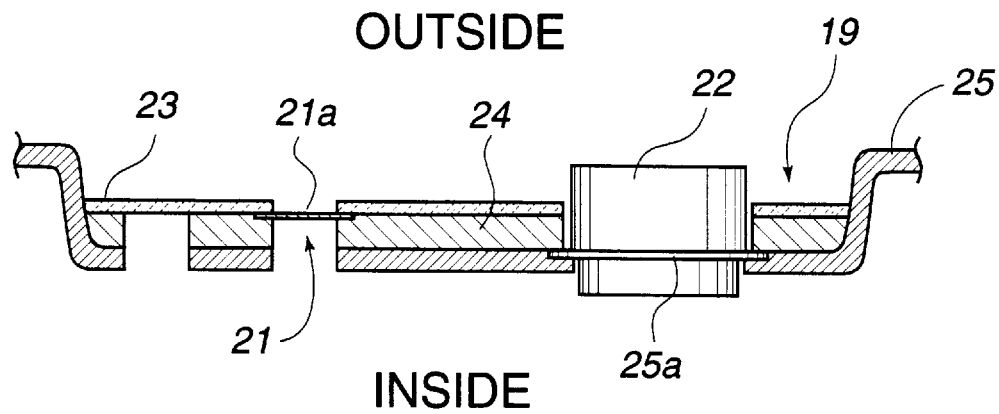
FIG. 3 shows the right side of the cross section along the area between (3) and (3) on FIG. 2.

As shown in FIG. 3, the receiver 30 when inserted in the case should preferably be inserted in a specific orientation so that any alarms, displays and control buttons are properly oriented with respect to a clear display plate 23, a hole for the alarm 21 and the button 22 so that each of these items will function for their intended uses. A uniqueness of this water-resistant case 10 is that alarm hole 21 provided in the same location as that of the buzzer on the portable receiver is tightly closed by a waterproof sheet 21a that allows the air to get through but not a drop of water. Consequently, the case does not change the volume of the buzzer and has the needed water-proof effect.

The methods of how hole 21, light display window 20, and button 22 are installed and structured is as follows:

Holes to place light display window 20, hole 21, and button 22 are provided in preferably an indented section 19 of the right side case portion 25 of the water-resistant case 10.

An external button 22 is made of silicone rubber or the like that protrudes from outside the case portion 25 when placed in the hole for a user to press and depress a matching switch (not shown) on the portable receiver 30 covered by water-resistant case 10.

To attach the button 22 to the outside case portion 25, a collar 25a is defined around at least a portion of the periphery of the button 22. This collar 25a is slightly larger than the hole in which the button 22 is to be placed. Parts of the case 25 may be indented to fit these collars to match the height of the top surface of the collar 25a and the outside of the case when mounted. The collars rest on the outside surface of the case portion 25 and are securely affixed by a both-sided adhesive sheet 24 that may be applied over the outside surface of the indented section of the case portion 25. There are grooves/spaces between the areas protruding to the top and bottom and the respective collars allowing the button to be pressed without restriction.

The both-sided adhesive sheet 24 is preferably made of an acrylic form material and has predefined appropriate holes for light display window 20, hole 21, and button 22. This both-sided adhesive sheet 24 absorbs air bubbles and has excellent water-proofing effects and is also preferably air tight.

The waterproof sheet 21a is slightly larger than the diameter of the audio alarm hole 21 and is placed over hole 21 and with the edges on top of adhesive 24. This sheet 21a is a porous film made of uranium tetra-chloride resin with a pore diameter of about 20 μm and has more than 80% in porosity. Thus, air can get through the film but a water drop cannot. As a result, the actual sound of a buzzer from the portable receiver 30 within the case can be heard distinctly by the user. Other film materials can be used for sheet 21a so long as the material is capable of letting the air to get through but repels water.

A clear plate 23 such as an acrylic plate with appropriate holes for hole 21 and button 22 is then inserted on top of the adhesive surface 24. The back of clear plate 23 is painted except for the area of light display window 20 to create a window so that the light to inform users of incoming calls remains visible. Alternatively, the clear plate 23 could also not be painted or otherwise colored over the visual display of the pager 30.

As noted above, the portable receiver water-resistant case on this is tightly closed with a seal which allows the air to get through but not a drop of water. As a result, the volume of the audio alarm that informs users of incoming calls is audible while the case continues to offer appropriate sound proofing.

Thus, the case further provides a rubber button to allow the user to press the switch on the portable receiver within the case 30 to control operations of the receiver from outside. As a result, users do not need to take out the receivers from cases in order to operate them. Water-resistant case also has ribs to relay the same exact vibrations from the receiver in the case.

Although the disclosed embodiment shows only one button formed in the case for controlling the receiver within, it is of course within the scope of the invention to include additional such buttons for operating additional buttons on the receiver. Further, it would also be within the scope of the invention to form grooves around the periphery of the case portions and insert a silicone gasket within the groove for providing a water tight seal. In addition, although a double sided adhesive is shown as binding the button, the plate and the film to the case portion, other water tight securing methods may also be used.

I claim:

1. A method for assembling a water-tight case for a receiver, wherein the receiver includes an audio alarm, a display, a vibrating transducer, and a control button, the method comprising:

providing a case body having an outside and an inside surface, and defining an audio alarm opening, a display openings, and a control button opening;

positioning a film across the audio alarm opening, wherein the film has a pore size small enough to prevent water from passing therethrough and large enough to allow sound from the alarm to pass therethrough; and securing the film to one of the inside and the outside of the case, thereby forming a water-tight seal.

2. The method as described in claim 1, wherein the pore size of the film across the audio alarm opening has a diameter of at least about 20 μm.

3. A case for holding a receiver having an external surface, wherein the receiver may include at least one control button, an audio alarm, a vibrating transducer, and a display for displaying received information, the case comprising:

an audio alarm opening;

a first and second case portion having interior and exterior surfaces, coupled together in one of a first closed position and a second open position, wherein in the first closed position the interior surfaces of the first and second case portions form a closed, water-tight housing for securely holding the receiver, and wherein in the second open position the receiver may be removed from the housing formed by the first and second case portions; and a film positioned across the audio alarm opening, wherein the film has a pore size small enough to prevent water from passing therethrough and large enough to allow sound from the alarm and air to pass therethrough.

4. The case as defined in claim 3, wherein the audio alarm opening is located in at least one of the case portions and is opposed to the audio alarm of the receiver when the receiver is disposed within the cavity formed by the case portions in the first position, further comprising a film having a pore size less than the size of a water droplet sealed across the audio opening, wherein sound from the audio alarm can be heard and air can pass through the film but water cannot penetrate past the film.

5. The case as defined in claim 3, wherein the pore size of the film positioned across the audio alarm opening has a diameter of at least about 20 µm.

6. A method for assembling a water-tight case for a receiver, wherein the receiver may include an audio alarm, a display, a vibrating transducer, and a control button, the method comprising:

providing a case body having an outside and inside surface and defining an audio alarm opening, wherein the inside surface forms a housing for holding the receiver; and positioning a film across the audio alarm opening, wherein the film has a pore size small enough to prevent water from passing therethrough and large enough to allow sound from the audio alarm and air to pass therethrough.

7. The method as defined in claim 6, wherein the pore size of the film across the audio alarm opening has a diameter of at least about 20 µm.

8. A case for holding a receiver having an external surface, wherein the receiver includes at least one control button, an audio alarm, a vibrating transducer, and a display for displaying information, the case comprising:

an audio alarm opening:

a film positioned across the audio alarm opening, wherein the film has a pore size small enough to prevent water from passing therethrough and large enough to allow sound from the audio alarm and air to pass therethrough;

a first and second portion comprised of a material that transfers palpably perceptible vibrations, having interior and exterior surfaces, moveably coupled together between a first closed position and a second open position, wherein in the first closed position the interior surfaces of the first and second case portions form a closed, water-tight housing for securely holding the receiver, and wherein in the second open position the receiver may be removed from the housing formed by the first and second case portions, wherein the vibrating transducer of the receiver vibrations on the exterior surface of the case body, and at least one cushion positioned between the external surface of the receiver and one of the case portions in the closed position to maintain a surface of the receiver engaged with the interior surface of one of the case portions to transfer palpably perceptible vibrations from the vibrating transducer to the case.

9. The case as defined in claim 8, wherein the pore size of the film positioned across the audio alarm opening has a diameter of at least about 20 µm.

* * * * *